United States Patent
Szathmary et al.

(10) Patent No.: US 7,882,052 B2
(45) Date of Patent: Feb. 1, 2011

(54) EVOLUTIONARY NEURAL NETWORK AND METHOD OF GENERATING AN EVOLUTIONARY NEURAL NETWORK

(76) Inventors: Eors Szathmary, Matyas Kiraly ut 38, H-1125 Budapest (HU); Zoltan Szatmary, Arpad ut 55, H-1042 Budapest (HU); Peter Ittzes, Telepes u. 64/B, H-1147 Budapest (HU); Szabolcs Szamado, Liget u. 50, H-2011Budakalasz (HU)

( * ) Notice: Subject to any disclaimer, the term of this patent is extended or adjusted under 35 U.S.C. 154(b) by 664 days.

(21) Appl. No.: 11/847,537

(22) Filed: Aug. 30, 2007

(65) Prior Publication Data

US 2008/0065575 A1    Mar. 13, 2008

Related U.S. Application Data

(60) Provisional application No. 60/843,427, filed on Sep. 11, 2006.

(51) Int. Cl.
| | |
|---|---|
| *G06F 15/18* | (2006.01) |
| *G06E 1/00* | (2006.01) |
| *G06E 3/00* | (2006.01) |
| *G06G 7/00* | (2006.01) |
| *G06N 3/04* | (2006.01) |

(52) U.S. Cl. .......................... 706/27; 706/13
(58) Field of Classification Search .................... 706/27
See application file for complete search history.

(56) References Cited

U.S. PATENT DOCUMENTS

| | | | |
|---|---|---|---|
| 5,142,195 A | 8/1992 | Heider et al. | |
| 5,214,746 A * | 5/1993 | Fogel et al. | 706/25 |
| 5,995,952 A * | 11/1999 | Kato | 706/15 |
| 6,311,174 B1 * | 10/2001 | Kato | 706/25 |
| 7,363,281 B2 * | 4/2008 | Jin et al. | 706/13 |
| 7,756,804 B2 * | 7/2010 | Bloom et al. | 706/46 |
| 2007/0288410 A1 * | 12/2007 | Tomkins et al. | 706/42 |

FOREIGN PATENT DOCUMENTS

EP    0451647    10/1991

OTHER PUBLICATIONS

A Joint Evolutionary Neural Network for Intrusion Detection, Biying Zhang; Xuesong Jin; Information Engineering and Computer Science, 2009. ICIECS 2009. International Conference on Digital Object Identifier: 10.1109/ICIECS.2009.5364614 Publication Year: 2009 , pp. 1-4.*

* cited by examiner

*Primary Examiner*—Michael Holmes
(74) *Attorney, Agent, or Firm*—Young & Thompson

(57) ABSTRACT

An evolutionary neural network and a method of generating such a neural network is disclosed. The evolutionary neural network comprises an input set consisting of at least one input neuron, said input neurons being adapted for receiving an input signal form an external system, an output set consisting of at least one output neuron, said output neurons being adapted for producing an output signal for said external system, an internal network composed of a plurality of internal neurons, each internal neuron being adapted for processing a signal received from at least one of said input neurons or other internal neurons and producing a signal for at least one of said output neurons or other internal neurons, and a plurality of synapses constituting connections between said neurons, each of said synapses having a value of strength that can be adjusted by a learning process. Each of said neurons is assigned to a neuron class, the parameter values of which are defined by the genotype of the neural network, and each of said synapses are assigned to a respective synapse class, the parameter values of which are also defined by said genotype of the neural network. At reproduction, the genotype of any new neural network is subject to genetic operations. The evolutionary neural network is associated with a neural space, said neural space comprising a plurality of neural layers. Each neuron is associated with at least one neural layer and described by a set of topographical parameters with respect to said neural space. At least one of said topographical parameters of at least the internal neurons is encoded in the genotype of the evolutionary neural network in a statistical form.

13 Claims, 5 Drawing Sheets

EVOLUTIONARY NEURAL NETWORK AND METHOD OF GENERATING AN EVOLUTIONARY NEURAL NETWORK

BACKGROUND OF THE INVENTION

1. Technical Field of the Invention

The present invention relates to evolutionary neural networks, a method of generating evolutionary neural networks and a computer program product.

2. Description of Related Art

Artificial neural networks are computational models of the nervous systems. Natural organisms, however, do not posses only nervous systems but also genetic information stored in their cells. This genetic information is called genotype. The information specified in the genotype determines, inter alia, the general aspects of the nervous system, whereas the individual aspects (phenotype) of the nervous system is derived from the genotype through a process called development. Similarly to natural organisms, artificial neural networks can also be evolved by using evolutionary algorithms.

To evolve neural networks, it should be decided how to encode aspects of the neural network in the genotype in a manner suitable for the application of genetic operators that are used to randomly modify the information stored in the genotype when a new individual (i.e. a new neural network, in this case) with a specific phenotype is reproduced. One possible way to code genetic information is direct encoding. In a direct encoding scheme, there is a one-to-one correspondence between the genes and the phenotypical characters subjected to the evolutionary process. This kind of encoding is described, for example, in Miller et al., "Designing neural networks using genetic algorithms "(Proc. of the Third International Conference on Genetic Algorithms, San Mateo, Calif., USA, 1989, pp. 379-384). Another most promising way to encode genetic information is indirect encoding, which allows to develop more flexible and scalable (open-ended) encoding schemes. These encoding schemes include, for example, the marker-based encoding described in Fullmer at al., "Using marker-based genetic encoding of neural networks to evolve finite-state behaviour" (Proc. of the First European Conference on Artificial Life, MIT Press, Cambridge, Mass., USA, 1992, pp. 255-262), and the tree structure encoding described in Zhang et al., "Genetic programming of minimal neural nets using Occam's razor" (Proc. of the Fifth International Conference on Genetic Algorithms, 1993, pp. 342-349).

SUMMARY OF THE INVENTION

An object of the present invention is to provide evolutionary neural networks which, both by their operation and their structure, mimic the real neural networks like the brain, mimic the ontogeny of the brain, mimic the phylogeny of the brain and mimic demographically structured populations of the individuals having such neural networks in a much more realistic and flexible way than ever presented in the prior art.

Another object of the present invention is to provide evolutionary neural networks, the generation of which resulting in a random neural structure due to a highly indirect genotype-phenotype mapping carried out on a statistical basis.

These and other objects are achieved by providing an evolutionary neural network comprising:

an input set consisting of at least one input neuron, said input neurons being adapted for receiving an input signal form an external system;

an output set consisting of at least one output neuron, said output neurons being adapted for producing an output signal for said external system;

an internal network composed of a plurality of internal neurons, each internal neuron being adapted for processing a signal received from at least one of said input neurons or other internal neurons and producing a signal for at least one of said output neurons or other internal neurons; and a plurality of synapses constituting connections between said neurons, each of said synapses having a value of strength that can be adjusted by a learning process;

wherein each of said neurons is assigned to a neuron class, the parameter values of which are defined by the genotype of the neural network; and each of said synapses are assigned to a respective synapse class, the parameter values of which are also defined by said genotype of the neural network; and wherein at reproduction, the genotype of any new neural network is subject to genetic operations.

The evolutionary neural network according to the invention is associated with a neural space, said neural space comprising a plurality of neural layers, and each neuron is associated with at least one neural layer and described by a set of topographical parameters with respect to said neural space, wherein at least one of said topographical parameters of at least the internal neurons is encoded in the genotype of the evolutionary neural network in a statistical form.

The above objects are further achieved by providing a method of generating an evolutionary neural network according to the invention, the method comprising the steps of:

creating at least one input neuron, at least one output neuron and a plurality of internal neurons;

creating a plurality of synapses between the neurons;

wherein the synapses and at least the internal neurons are created by using statistical processes based on the actual values of the topographical parameters defined by the neuron classes of the neurons.

Finally, the above objects are also achieved by providing a computer program product in a computer-readable medium comprising instructions that, when executed by a computer, enables the computer to perform the method according to the invention.

BRIEF DESCRIPTION OF THE DRAWINGS

The invention is now described through preferred embodiments with references to the accompanying drawings, in which.

DETAILED DESCRIPTION OF THE DRAWINGS

First of all, general definitions and features of evolutionary neural networks and their typical simulation environment are described.

Figure 1:
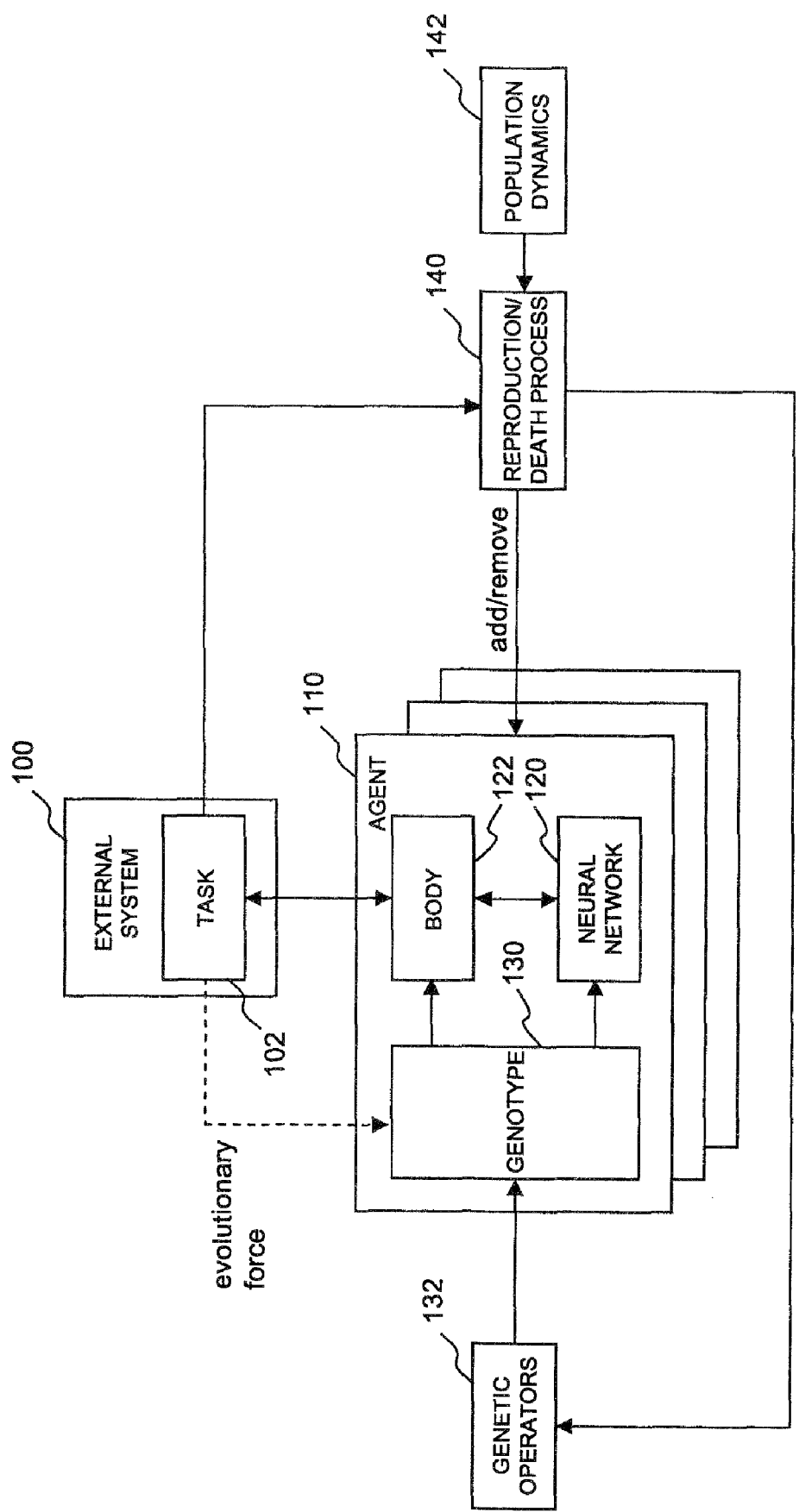
FIG. 1 illustrates schematic block diagram of the simulation environment of an evolutionary neural network.

As shown in FIG. 1, artificial neural networks are used to control or operate with an external system 100 that is to complete a task 102. The external system 100 may be of any type including communications systems, information systems, process control systems, pattern recognition systems, etc., which requires the use of a neural network 120 or a group of co-operating neural networks 120 to complete a typically non-algorithmic task 102 implemented in the external system 100.

In most cases, there is a population of agents 110 working together on completing the task 102, wherein each agent 110 has a neural network 120, functioning as a brain, and a body 122 for communication with the external world 100. The body 122 contains sensors and effectors and as such, they provide the necessary input and output facilities for the neural network 120.

During operation, agents 110 gain a so-called score (fitness) value according to their proficiency in the task 102. The fitness value can be used to regulate the size of the population. A task 102 can be solitary or social, reflecting the number of agents 110 required to solve it. In case of a social task 102, the actual fitness value of a particular agent 110 may depend on the performance of its fellows as well.

There is a reproduction/death process 140 managing the population to maintain the optimum number of agents 110 as required by the task 102. The reproduction/death process 140 can remove agents 110 from the population at any time, but it can reproduce new agents 110 as well, thus replenishing the population and allowing genetic evolution of the population. It is the responsibility of the reproduction/death process 140 to stabilize the size of the population, which is particularly necessary because of the finite computing resources. When reproduction of the agents 110 is sexual, the reproduction process preferably comprises a mating procedure for selecting pairs from the population. In most cases, generations of agents 110 may overlap, i.e. agents 110 used for reproducing new agents 110 are allowed to further live after the reproduction procedure. The reproduction/death process 140 is provided with population dynamics 142 including predetermined rules and parameters for supervising the process. Parameters of the population dynamics 142 may be time-dependent.

Characteristics of the neural network 120 and the body 122 of each agent 110 are encoded in the genotype 130 of the agent 110. In general, information stored in the genotype 130 is used to create an individual agent 110 with particular properties (phenotype) via a genotype-phenotype mapping process. Most preferably, an indirect encoding scheme is used to store genetic information in the genes, which simply reflects the biological fact that there are (by several orders of magnitude) more neurons than genes. Such an indirect encoding scheme may be the marker-based encoding scheme or the tree structure encoding, as mentioned before. Using trees for indirect encoding has the further advantage of storing information in a semantically structured way. Since virtually all mechanisms converting a genotype to a phenotype in an artificial system exploit the underlying semantics of the genetic data, it is preferred to store the genetic data directly in the format that will be used.

Genetic operators 132, including point mutation, deletion, duplication and recombination, are used to modify the information encoded in the genotype 130. When a tree structure is used for encoding the genetic information, the genetic operators 132 may modify the value of any node of the tree or even may change the structure of the tree itself. Mutation of atomic genes provides a random walk over a fixed dimensional genetic space. Additionally, duplication and deletion of sub-genes in a gene of list type guarantee the open-ended behaviour of the system, and allow to scale up the search space, if it is required in a new situation. In order to reduce the negative effect of genetic linkage, the use of recombination is also necessary (see Calabretta et al., "What does it take to evolve behaviorally complex organisms?" BioSystems 69, 2003, pp. 245-262). Interpretation of the recombination on a tree structure is not straightforward though, and careful specification of the expected behaviour of the recombination operator is inevitable. All the above mentioned genetic operators may or may not be included in a particular simulation run, and an optimal combination of these genetic operators depends on the particular task 102.

Through the genetic operators 132 used for the reproduction of new agents 110 with slightly different neural networks 120, the task 102 indirectly provides an evolutionary force (indicated by a dashed line in FIG. 1) to the population of agents 110, thus causing the whole population to genetically evolve so that it complete the respective task 102 with the desired result.

In addition to the above mentioned general features of the conventional evolutionary neural networks, the evolutionary neural networks according to the invention are also associated with a multi-dimensional neural space, in which at least the internal neurons are provided with topographical information in relation to the neural space. The neural space preferably comprises several neural layers which contain the internal neurons. These neural layers may be abstract layers or multi-dimensional geometrical surfaces along which the neurons extend. In the latter case, the geometrical neural surfaces may be two-dimensional planar surfaces, three-dimensional surfaces, or, in more complicated cases, even more dimensional surfaces.

The topographical information may include the soma position (i.e. position of the neuron's central point) of an internal neuron in the neural space, morphology of an internal neuron or the distant end position of the projections of an input neuron, an output neuron or an internal neuron, but other kind of topological information may also be implemented depending on the particular application of the evolutionary neural network according to the present invention. Morphology information relating to an internal neuron may be used to specify the shape and the dimensions of the internal neuron within the neural surface containing the neuron itself. Morphology information preferably includes properties of the so called dendritic arborization of the internal neuron that is, in fact, composed of projections (or arms) of the internal neuron within a particular neural layer. A neuron may extend along two or even more neuron layers as well. These projections or arms have particular importance in establishing new synapses (live connections) between the neurons.

In order to increase flexibility of the generation of new neurons, at least one of the aforementioned topographical parameters of at least the internal neurons is encoded in the genotype of the neural network in a statistical form. In a preferred embodiment of the evolutionary neural network according to the invention, the soma position of an internal neuron in the neural space is encoded in the genotype by the actual parameter values of a first probability density function of soma positions defined over said neural space. In such a case, the actual position of a new internal neuron is generated by sampling a soma location from the neural space according to said first probability density function defined by the neuron class of the particular internal neuron. Similarly, the distant end position of the projections of any neuron may also be encoded in the genotype by a second probability density function of end-point positions defined over the neural space, and the actual distant end position of any new projection is generated by sampling an end-point location from the neural space according to said second probability density function. The second probability density function is also defined by the neuron class of the particular neuron. Like any other genetic information, the topographical parameters encoded in the genotype may also be subject to genetic operators at the reproduction of the evolutionary neural networks.

For the sake of simplicity, in the subsequent part of the description, only the genome (genotype) of the neural network of the agents will be dealt with, thus the term "genotype" will be referred to as the genotype of the neural network of an agent, i.e. that part of the entire genotype of an agent that is related to the neural network only.

Figure 2:
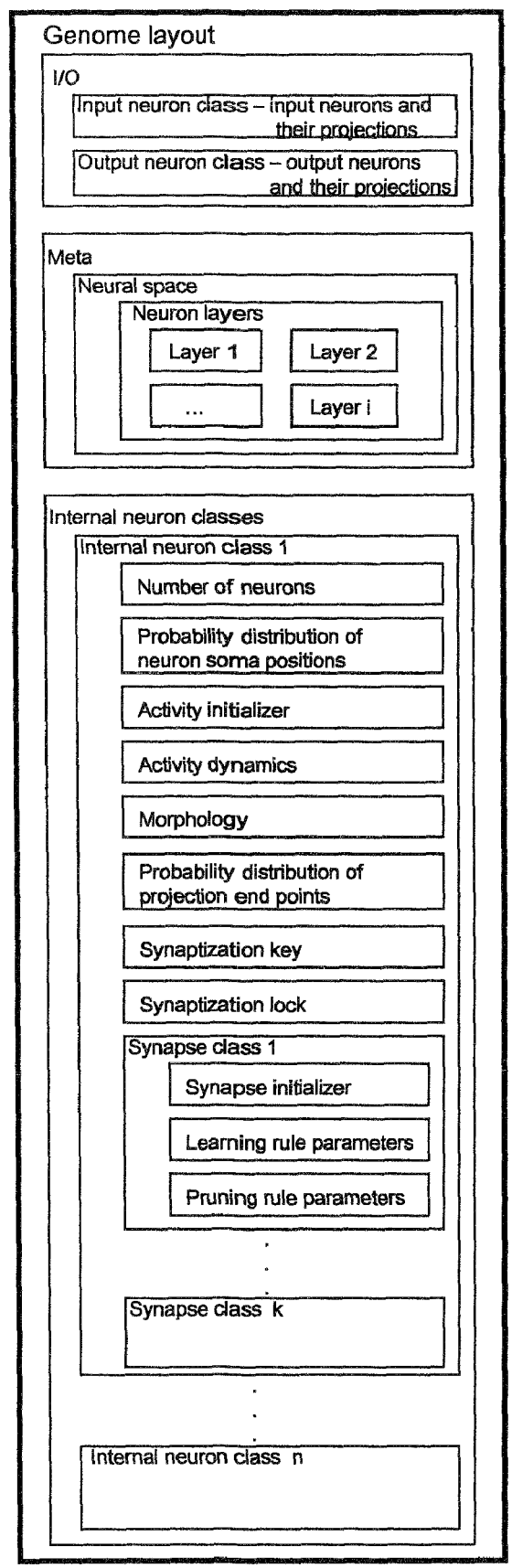
FIG. 2 illustrates a block diagram of the layout of the genome of an evolutionary neural network, according to an embodiment of the present invention.

FIG. 2 illustrates a block diagram of the layout of the genome of an evolutionary neural network according to a preferred embodiment of the present invention. In this embodiment the genotype is encoded in a hierarchical tree. This tree-based representation defines and implements the data structure of the genome. Atomic genes, residing at the leaf nodes in the tree, contain actual numeric or other elements of data, whereas composite genes aggregate subgenes (atomic or other composite genes).

The major purpose of composite genes is to semantically structure data. There may be several types of atomic genes (integer gene, real gene, Boolean gene, bitvector gene, etc.), all corresponding to a particular elementary data type to be stored. Composite genes may be subdivided into subtypes, such as list genes, structure genes and option genes. Structure genes aggregate semantically cohesive subgenes, one per each semantic subcategory. List genes may contain an arbitrary number of subgenes with the same semantic meaning, all of which are expressed during the structural evolution of the neural network (ontogenesis). Option genes also contain a multitude of semantically interchangeable subgenes, only one of them being expressed during the ontogenesis, whereas the others being silent.

The proposed genetic operations to be used for the evolutionary neural network according to the invention include point mutation, duplication, deletion and sub-tree recombination (where only semantically meaningful sub-trees are recombined), preferably applied in this priority order.

In the evolutionary neural networks, both of the neuron properties and the synapse properties may vary through the genetic operators at the reproduction of a neural network. In addition to this feature of the evolutionary neural networks, the actual neural structure of the evolutionary neural networks according to the invention results from a random process during the genotype-phenotype mapping, which allows an even higher degree of diversity of the network even if they have the same genotype, for example.

Ontogenesis, i.e. generation of the neural network structure, of the evolutionary neural network according to the invention has two phases; creating new neurons (neurogenesis); and then creating synapses between the neurons (synaptogenesis). The process of ontogenesis is carried out based on the network's genotype. The genome does not encode individual neurons or synapses, rather it represents properties of a neurogenetic and synaptization processes in a highly indirect way as mentioned before, i.e. by the parameters of various probability density functions, for example. Learning processes are used to modify the synapse efficiencies, wherein the parameters of the applied learning rule may also be under genetic control. The learning rules may include standard local learning rules used in unsupervised or reinforcement learning protocols.

As shown in FIG. 2., the genome of a preferred embodiment of the evolutionary neural network according to the invention comprises I/O data, Meta data and one or more internal neuron class, each internal neuron class being used to encode the properties of one type of internal neuron.

I/O data may comprise the genetic information of the input neurons (sensors connected to an external system) and their projections, as well as the genetic information of the output neurons (effectors connected to an external system) and their projections. In certain cases, projections of the input/output neurons may be described by topographical parameters relating to the neural space.

Meta data are used to encode genetic information relating to the neural space. As the neural space preferably comprises several neuron layers, Meta data includes the genetic information of a plurality of neuron layers. When the neuron layers are implemented in the form of geometrical surfaces in the neural space, the neuron layers may be specified, for example, by the parameters of their surface function or any other geometrical parameters thereof.

Layers of the neural space are indirectly referred to in the genotype. Layers are associated with a fixed length binary string called "lock", and in the genotype, any reference to the layers is substituted with a binary string called "key" having the same length as the lock. During construction of a neural network, the layer with a lock having the smallest Hamming-distance from the reference key is used. In this way, references indicating non-existing layers in the genotype due to deletion of a layer can be avoided, as there will always be a layer with a smallest Hamming-distance.

The evolutionary neural networks according to the invention consist of input neurons forming an input set, output neurons forming an output set, internal neurons forming an internal network between the input neurons and the output neurons set, and a plurality of synapses that interconnect the neurons to each other. Each neuron belongs to a particular neuron class. A neuron class specifies the genetically encoded properties of the neurons. These parameters may include, inter alia, the number of neurons allowed to belong to the particular neuron class, parameters of the probability density function of the internal neuron soma positions in the neural space, activity initializing parameters, parameters of the activity dynamics, morphological parameters, parameters of the probability density function of the end-points of the projections over the neural space, synaptization key data and synaptization lock data. Although one neuron belongs to only one neuron class, any one of the neuron classes may contain any number of neuron. Therefore a basic parameter of any neuron class is the number of neurons belonging to it.

Representation of the evolutionary neural networks in a topographic neural space allows to provide the internal neurons with spatial shapes and dimensions defining the morphology of the internal neurons within the neural space. The neuron morphologies may have an arbitrary high level of details. However, for practical reasons, the neuron morphology is to be only coarsely detailed and preferably reduced to simple geometrical shapes like circles, ellipses, etc. on each layer. As the neuron morphology stored in the genome may also be subject to genetic operators, during evolution of the evolutionary neural networks, the network structure may also vary due to a change in the morphology of the neurons.

Internal neurons may further be characterized by an activity. Activities are initialized by an activity initialization algorithm. The initialization can take place whenever the task requires it. The activity of any internal neuron is subject to activity dynamics operating on it over time. The internal neural classes determine the activity dynamics of all internal neurons belonging to that class, that is, all internal neurons of the same internal neural class share the same activity dynamics. The internal neural classes also determine the activity initialization algorithm of all internal neurons belonging to that class, that is, all internal neurons of the same internal neural class share the same activity initialization algorithm. For example, many kinds of activity models and dynamics can be used, including the rate code or spikes as activity model and summation of synaptic contributions fed through various transfer functions as activity dynamics. Of course, variations of core concepts are not necessarily compatible with each other. If, for example, a synapse model expects the presynaptic neuron activity to be rate coded, then somehow it must be ensured that the presynaptic neuron class really defines its activity model as rate code. A software framework may provide some mechanisms to enforce such compatibilities but eventually it is always the person designing the simulation who is responsible for the overall coherence.

The number of internal neuron classes may be different for different neural networks of a group of co-operating evolutionary neural networks. The number of internal neuron classes is therefore encoded in the genotype.

The internal neuron classes may further comprise synapse classes, the number of which depends on the total number of neuron classes. A synapse class is used to specify the parameters of the synapses connecting two neurons belonging to different neuron classes (or to the same neuron class). Consequently, in case of multiple synapse classes, each synapse class stores the parameters of an alternative synapse type.

There is one synapse class for every possible ordered pairing of a presynaptic neuron class with a postsynaptic neuron class, including pairs in which the presynaptic neuron and postsynaptic neuron belong to the same neuron class. The presynaptic neuron is the neuron initializing the establishment of a new sysnapse with another neuron, whereas this latter one is called the postsynaptic neuron.

For example, if a presynaptic neuron class is labeled by A and a postsynaptic neuron class is labeled by B, then the synapse class associated with the ordered pair of the two neuron classes can be labeled by [A; B]. All synapses connecting a neuron belonging to the neuron class A with a neuron belonging to the neuron class B will belong to the synapse class [A; B]. Consequently, if the number of internal neuron classes of a particular neural network is N, the number of input neurons therein is I, and the number of output neurons therein O, then the total number of synapse classes for this neural network will be $N*N+I*N+N*O$. The complete set of these synapse classes is referred to as the synapse class matrix.

Synapses are characterized by modifiable strength values (or efficiency values) and optionally by other properties like delay. The strength variable and other variables of the synapses are collectively called the synapse model. Synapses are initialized by a synapse initialization algorithm. The initialization takes place whenever the task requires it. Variables of a synapse as defined by its synapse model are subject to learning dynamics operating on the synapse over time. A synapse may also be subject to pruning dynamics operating on it over time. Pruning is a special operation of the learning process for the removal of a synapse after the ontogenesis phase, i.e. causing the strength of the synapse to be zero. Synapse classes determine the synapse model of all synapses belonging to that synapse class, that is, all synapses of the same synapse class share the same synapse model. Synapse classes also determine the learning dynamics operating on all synapses belonging to that synapse class, that is, all synapses of the same synapse class share the same learning dynamics. Synapse classes further determine the synapse initialization algorithm operating on all synapses belonging to that synapse class, that is, all synapses of the same synapse class share the same synapse initialization algorithm.

Synapse classes determine the pruning dynamics operating on all synapses belonging to that synapse class, that is, all synapses of the same synapse class share the same pruning dynamics. Although parameters describing the synapse model, the learning dynamics, the pruning dynamics and the synapse initialization algorithm associated with a synapse class are all stored in the genotype, the full matrix of synapse classes is, however, not stored in the genotype.

All of the aforementioned genetic information stored in the genotype may be subject to genetic operators during reproduction of the evolutionary neural network. The application of genetic operators on semantically correct parent genotypes, however, must not result in a semantically incorrect child genotype. Semantic correctness is defined as the possibility to construct a neural network from the information encoded in the genotype. The genetic operations are based on storing the genetic information in a "semantics reflecting" data structure, and implementing "semantics-aware" genetic operators.

In the following, the operation of preferred embodiments of the method according to the present invention will be described with reference to FIGS. 3a-f and 4.

Figure 3A:
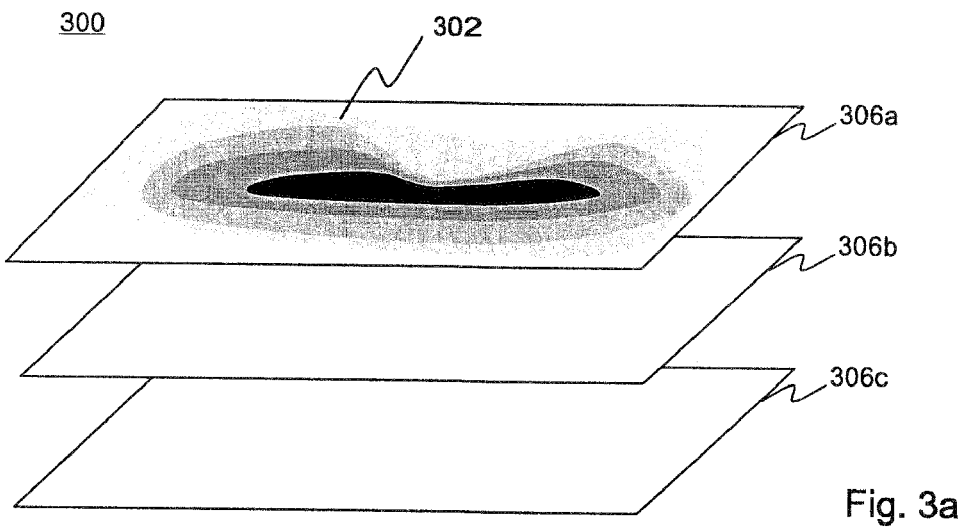
FIGS. 3a-f schematically illustrate the process of creating a new neuron with synapses in a layered, multi-dimensional neural space, according to an embodiment of the present invention.
Figure 3B:
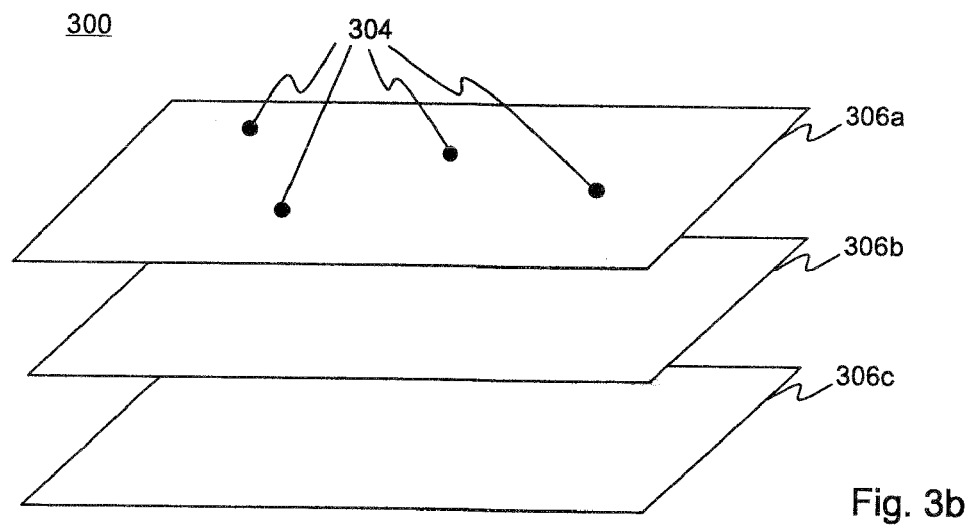
Figure 3C:
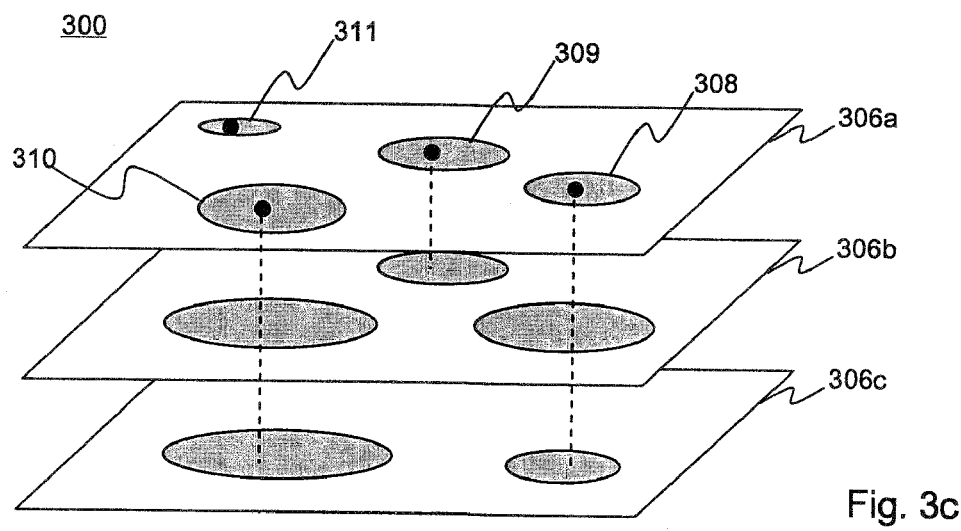
Figure 3D:
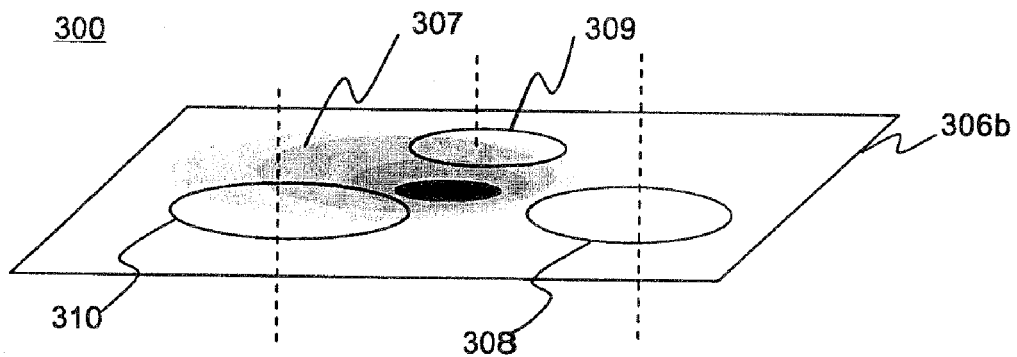
Figure 3E:
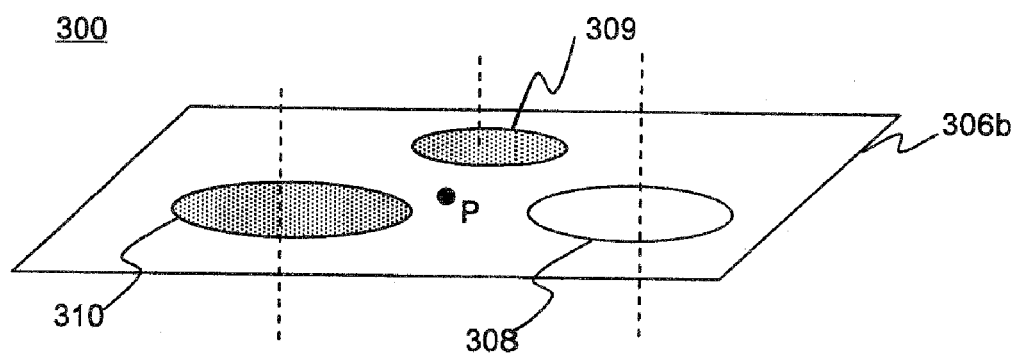
Figure 3F:
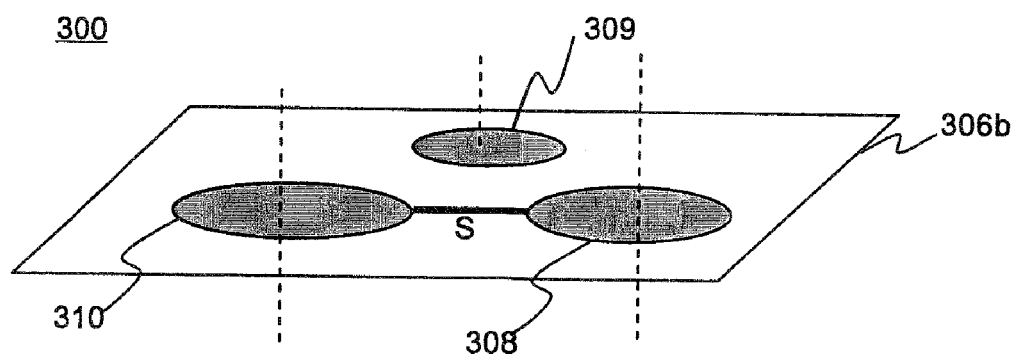
Figure 4:
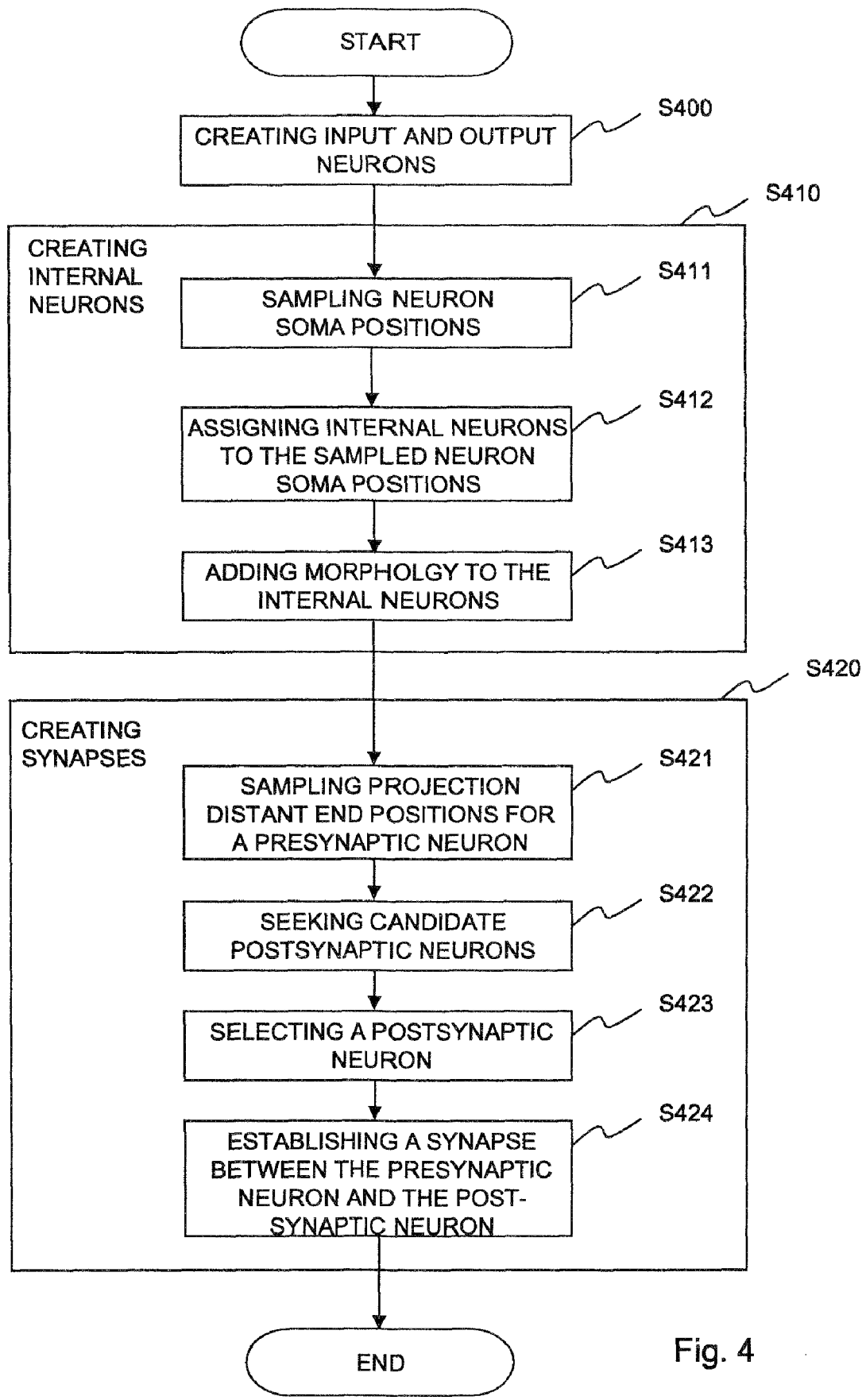
FIG. 4 is a flow diagram showing the steps of evolving the structure of an evolutionary neural network, according to an embodiment of the present invention.

FIG. 3a-f schematically illustrate the process of creating new internal neurons with synapses in a layered neural space, according to an embodiment of the present invention, whereas FIG. 4 is a flow diagram showing the steps of generating a new evolutionary neural network, according to an embodiment of the present invention.

Construction of an evolutionary neural network (i.e. ontogenesis) according to the invention consists of two succeeding phases, i.e. the neurogenesis and the synaptogenesis. The ontogenesis is preceded by the construction of the synapse class matrix. These processes are controlled by the genotype in a highly indirect manner, which means that no part of the genotype corresponds to individual neurons or synapses, but only gross statistical properties of the neural network with respect to the generation of the neural network are encoded in the genes. Hence, individual neural networks are "sampled" entities according to this statistical description, which results in the reproduction of neural networks with partly random structural properties.

The synapse class matrix construction is carried out as follows. Each neuron class contains a list for each of the synapse class properties, including the synapse model, the learning dynamics, the pruning dynamics and the synapse initialization algorithm. Each list contains alternatives of the synapse class properties, each alternative property being identified by a fixed length binary string, i.e. the so called "key". The list itself is associated with a binary string called "lock" having the same length as the key. A key matches a lock as much as little the Hamming-distance between their binary strings is. When a synapse class property between two neuron classes is requested for building the appropriate synapse class in the matrix, keys of alternatives in the presynaptic neuron class are matched to the lock of the postsynaptic list. The best matching alternative (i.e. the alternative with the key being closest to the lock in terms of the Hamming-distance) is selected for the synapse class.

In the evolutionary neural networks according to the invention, the neurogenesis phase proceeds as follows. Internal neurons are situated in a layered topographic neural space 300 mimicking the real cortical layers of the brain. (We note that low-level biological mechanisms responsible for shaping the cortex, such as concentration gradient dependence, are not implemented in the process of neurogenesis of the neural networks according to the present invention.) Each internal neuron class of the neural network defines a first probability density function 302 of neuron soma positions over the neural space, as shown in FIG. 3a. By using this probability density function 302, soma positions 304 for the individual internal neurons 308, 309, 310, 311 are sampled in one of the neuron layers 306a, as illustrated in FIG. 3b. For each internal neuron class, so many neuron soma positions 304 are sampled as many specified by the internal neuron class of the particular internal neuron.

As shown in FIG. 3c, in all sampled soma positions, an internal neuron 308-311 is created which is then provided with a morphology determined by the genotype. Neuron morphology may be represented by any function over the neural space 300 that is capable of describing the dendritic arborization of the internal neuron 308-311. The morphological properties are applied to each internal neuron 308-311 relative to its sampled soma position. In FIG. 3c, the dendritic arborization is represented by circles according to one of the simplest implementations. Additionally, any internal neuron 308-310 may have a dendritic arborization in one ore more adjacent neuron layer 306b, 306c, wherein the dendritic arborizations in different neuron layers 306a, 306b, 306c belonging to the same internal neuron 308-310 are connected by vertical dashed lines, respectively.

The process of synaptogenesis proceeds in the following way. As shown in FIG. 3e, for each presynaptic neuron 308, one or more putative synapse position P is sampled according to a second probability density function 307 (illustrated in FIG. 3d) of the distant end positions of the projections. We note that FIG. 3e illustrates only one putative synapse position P for the sake of simplicity. The aforementioned second probability density function 307 is also specified by the neuron class of the presynaptic neurons.

For each putative synapse position P, the dendritic arborization of all neurons 308-310 are checked for what distance they are from the particular putative synapse position P. Neurons 309, 3010 with a dendritic arborization overlapping the given putative synapse position P are added to the list of candidate postsynaptic neurons illustrated with a shadowed background pattern in FIG. 3e. The winner postsynaptic neuron 310 shown in FIG. 3f is selected from the candidate postsynaptic neurons 309, 310 based on a key-and-lock matching procedure similar to the one introduced in relation to the synapse matrix construction. After the successful matching procedure, a synapse S is generated between the presynaptic neuron 308 and the winner postsynaptic neuron 310. We note that other projections of the presynaptic neuron 308 may establish synapses with any other (or even with same) candidate postsynaptic neuron.

The above introduced process of synaptogenesis applies two mechanisms, similarly as in biology, wherein the generation of projections is a long-range mechanism, whereas the subsequent lock-and-key matching procedure is a short-range mechanism. The short-range lock-and-key mechanisms mimic the receptor/ligand-based binding mechanisms present in the real synaptogenesis.

The projections of the neurons, which may be specified by probability density functions over the neural space, can refer to either absolute coordinates or to relative coordinates with respect to the presynaptic neuron's soma position.

In a preferred embodiment of the method according to the invention, the locks and the keys may be strings of 30 bits. Every candidate postsynaptic neuron's lock is preferably matched to the presynaptic neuron's key. Binding probability is then a decreasing function of the Hamming-distance between the key and the lock.

In the evolutionary neural networks according to the present invention, the full topographic information of the neural networks are maintained, that is, neurons are situated in a layered neural space. The use of topographical information relating to the neural network has several advantages. First, the interpretation of the structure of the neural networks may be easier. Second, developmental processes can model biological processes of neuron and synapse generation more accurately. Models which acknowledge spatial information in biological systems yield various scale-free and small-world network attributes like those ones that are common in the brain structure (see Sporns et al. "Organization, development and function of complex brain networks" Trends Cogn. Sci. 8, 2004 pp. 418-425)

FIG. 4 shows a flow diagram illustrating the steps of a preferred embodiment of the method of generating an evolutionary neural network according to the invention.

First, in step S400, input neurons and output neurons are created, the number and other properties of which are specified by the input neuron class and the output neuron class, respectively. Next, at least one new internal neuron is created within the layered neural space in step S410, followed by the creation of at a plurality of synapses between the input neurons, the internal neuron(s) and the output neurons in step S420. The step of creating internal neurons, as well as the step of creating new synapses is carried out in the neural space through a statistical process based on the topographical parameters of the neurons. After generating the evolutionary neural network by carrying out the method according to the invention, the internal neurons are provided with an initial activity specified by an activity initialization algorithm. The initialization can take place whenever the task requires it. As mentioned before, the activity of the internal neurons is subject to activity dynamics operating on it over time. On a possibly different time scale, a set of learning rules and pruning rules are used to adapt the strength values of the synapses of the neural network so that the desired output signal of the neural network in response to a respective input signal be obtained.

In the embodiment of the method illustrated in FIG. 4, the step of creating new internal neurons comprises the following actions. In step S411 neuron soma positions are sampled in the neural space according to a first probability density function defined by the neuron class of the internal neuron to be created Next, internal neurons are assigned to all sampled neuron soma positions in step S412, and then each internal neuron is provided with a particular morphology defined by the neuron class of the particular internal neuron in step S413.

The step of creating synapses between a first neuron (presynaptic neuron) and a second neuron (postsynaptic neuron) comprises the following actions. In step S421, a distant end position for at least one projection of the presynaptic neuron is sampled over the neural space according to a second probability density function defined by the neuron class of the neuron. The projection end points are preferably sampled along one or more neuron layer in which the presynaptic neuron may have dendritic arborization. In step S422, candidate postsynaptic neurons with a dendritic arborization overlapping the distant end position of a particular projection of the presynaptic neuron are looked for. After selecting a postsynaptic neuron from the candidate postsynaptic neurons by using a predetermined matching algorithm, in step S423, a synapse is created between the selected postsynaptic neuron and the presynaptic neuron in step S424. For each presynaptic neuron, so many projection distant end positions are sampled as many defined by the neuron class of said neuron.

Finally, the above described method may be implemented as a computer program. Therefore the present invention also involves a computer program product stored in a computer-readable medium, said computer program product comprising instructions that, when executed by a computer, enables the computer to carry out any embodiment of the method according to the present invention.

Although the invention has been described with reference to particular embodiments, it is to be understood that the forms of the invention shown and described are to be treated as exemplary embodiments only. Various changes, substitutions and modifications can be realized without departing from the spirit and scope of the invention as defined by the appended claims.

The invention claimed is:

1. An evolutionary neural network, comprising:
   an input set consisting of at least one input neuron, said input neurons being adapted for receiving an input signal form an external system;
   an output set consisting of at least one output neuron, said output neurons being adapted for producing an output signal for said external system;
   an internal network composed of a plurality of internal neurons, each internal neuron being adapted for processing a signal received from at least one of said input neurons or other internal neurons and producing a signal for at least one of said output neurons or other internal neurons; and
   a plurality of synapses constituting connections between said neurons, each of said synapses having a value of strength that can be adjusted by a learning process,
   wherein each of said neurons is assigned to a neuron class, the parameter values of which are defined by the genotype of the evolutionary neural network,
   wherein each of said synapses are assigned to a respective synapse class, the parameter values of which are also defined by said genotype of the evolutionary neural network,
   wherein, at reproduction, the genotype of any new neural network is subject to genetic operations,
   wherein the evolutionary neural network is associated with a neural space, said neural space comprising a plurality of neural layers,
   wherein each neuron is associated with at least one neural layer and described by a set of topographical parameters with respect to said neural space, and
   wherein at least one of said topographical parameters of at least the internal neurons is encoded in the genotype of the evolutionary neural network in a statistical form.

2. The evolutionary neural network of claim 1, wherein at the reproduction of the evolutionary neural network, said at least one topographical parameter is subject to genetic operators.

3. The evolutionary neural network of claim 1, wherein said at least one topographical parameter includes at least one of the following pieces of information: soma position of an internal neuron in the neural space, morphology of an internal neuron, distant end position of a projection of an internal neuron or input neuron or output neuron.

4. The evolutionary neural network of claim 3, wherein the soma position of an internal neuron in the neural space is encoded in the genotype of the evolutionary neural network by a first probability density function defined over said neural space, and the actual soma position of an internal neuron is generated at the reproduction of the evolutionary neural network by sampling a location from the neural space according to said first probability density function.

5. The evolutionary neural network of claim 3, wherein the distant end position of a projection of a neuron is encoded in the genotype of the evolutionary neural network by a second probability density function defined over said neural space, and the actual distant end position of a new of projection is generated at the reproduction of the evolutionary neural network by sampling a location from the neural space according to said second probability density function.

6. The evolutionary neural network of claim 1, wherein the number of neurons belonging to a particular neuron class is determined by the genotype of the evolutionary neural network.

7. The evolutionary neural network of claim 1, wherein the neural space comprises a plurality of multi-dimensional surfaces, and each of the internal neurons has a dendritic arborization along at least one of said surfaces.

8. A method of generating an evolutionary neural network as claimed in claim 1, comprising the steps of:
   creating at least one input neuron, at least one output neuron and a plurality of internal neurons; and
   creating a plurality of synapses between the neurons,
   wherein the synapses and at least the internal neurons are created by using statistical processes based on the actual values of the topographical parameters defined by the neuron classes of the neurons.

9. The method of claim 8, wherein the step of creating a new internal neuron comprises the steps of:
   sampling a neuron soma position over the neural space according to a first probability density function defined by the neuron class of the internal neuron to be created;
   assigning a new internal neuron to the sampled neuron soma position; and
   providing the new internal neuron thus obtained with a morphology according to the respective topographical parameters defined by the neuron class of the particular internal neuron.

10. The method of claim 8, wherein the step of creating a new synapse between two neurons comprises the steps of:
    sampling a distant end position of at least one projection of a first neuron over the neural space according to a second probability density function defined by the neuron class of the first neuron;
    seeking candidate neurons which have a dendritic arborization overlapping the sampled distant end position of the projection of said first neuron;
    selecting a second neuron from the candidate neurons by using a predetermined matching algorithm; and
    creating a synapse between said first neuron and said second neuron.

11. The method of claim 9, wherein for each neuron class, so many neuron soma positions are sampled as many defined by the particular neuron class.

12. The method of claim 10, wherein for each of said first neurons, so many projection distant end positions are sampled as many defined by the neuron class of said first neuron.

13. A computer program product in a computer-readable medium comprising instructions that, when executed by a computer, enables the computer to perform the method of claim 8.

* * * * *